United States Patent
Nordquist

(10) Patent No.: US 12,439,847 B2
(45) Date of Patent: Oct. 14, 2025

(54) LOCKING DEVICE WITH FORCED UNPLUGGING OF CUTTING DECK

(71) Applicant: HUSQVARNA AB, Huskvarna (SE)

(72) Inventor: Dennis Nordquist, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 490 days.

(21) Appl. No.: 18/011,579

(22) PCT Filed: Oct. 21, 2020

(86) PCT No.: PCT/IB2020/059906
§ 371 (c)(1),
(2) Date: Dec. 20, 2022

(87) PCT Pub. No.: WO2022/064267
PCT Pub. Date: Mar. 31, 2022

(65) Prior Publication Data
US 2023/0284557 A1    Sep. 14, 2023

(30) Foreign Application Priority Data
Sep. 23, 2020  (SE) ................ 2051104-4

(51) Int. Cl.
*A01D 75/20* (2006.01)
*A01D 34/66* (2006.01)
(Continued)

(52) U.S. Cl.
CPC .......... *A01D 34/662* (2013.01); *A01D 34/78* (2013.01); *A01D 34/828* (2013.01); *A01D 75/20* (2013.01);
(Continued)

(58) Field of Classification Search
CPC ............ A01D 34/662; A01D 2034/645; A01D 2075/203
See application file for complete search history.

(56) References Cited

U.S. PATENT DOCUMENTS 3,997,749 A * 12/1976 Hanagan ............... H01H 1/42
200/321
4,981,011 A * 1/1991 Olejak ............... A01D 43/0631
56/DIG. 15
(Continued)

FOREIGN PATENT DOCUMENTS

CN    102802401 A    11/2012
CN    111543167 A     8/2020
(Continued)

OTHER PUBLICATIONS

International Search Report and Written Opinion for International Application No. PCT/IB2020/059906 mailed Jun. 21, 2021.
(Continued)

Primary Examiner — Joseph M Rocca
(74) Attorney, Agent, or Firm — Burr & Forman

(57) ABSTRACT

A riding yard maintenance vehicle includes a frame to which front wheels and rear wheels of the riding yard maintenance vehicle are attachable, a steering assembly configured to receive steering inputs by an operator of the riding yard maintenance vehicle, and a mounting assembly disposed at a front end of the riding yard maintenance vehicle to which a working assembly is attachable. The working assembly receives electrical power via a plug assembly and is configured to transition between a working position and a maintenance position while operably coupled to the mounting assembly. The mounting assembly includes a locking assembly configured to prevent the transition from the working position to the maintenance position while the plug assembly provides power to the working assembly.

20 Claims, 7 Drawing Sheets

(51) Int. Cl.
*A01D 34/78* (2006.01)
*A01D 34/82* (2006.01)
*A01D 34/64* (2006.01)

(52) U.S. Cl.
CPC .. *A01D 2034/645* (2013.01); *A01D 2075/203* (2013.01)

(56) References Cited

U.S. PATENT DOCUMENTS

| | | | |
|---|---|---|---|
| 5,927,055 | A | 7/1999 | Ferree et al. |
| 7,313,902 | B1 | 1/2008 | Eavenson, Sr. et al. |
| 7,559,385 | B1 * | 7/2009 | Burt .................... B60K 7/0007 |
| | | | 901/1 |
| 9,642,297 | B2 | 5/2017 | Nordquist |
| 11,712,001 | B2 * | 8/2023 | Zeiler .................... A01D 34/82 |
| | | | 56/17.5 |
| 11,917,940 | B1 * | 3/2024 | Wright .................... A01D 34/81 |
| 11,944,038 | B1 * | 4/2024 | Wright .................... A01D 34/73 |
| 12,185,665 | B1 * | 1/2025 | Wright .................... A01D 34/81 |
| 2007/0130902 | A1 | 6/2007 | Murawski |
| 2007/0283675 | A1 | 12/2007 | Hancock et al. |
| 2008/0141640 | A1 | 6/2008 | Wehler et al. |
| 2014/0102065 | A1 | 4/2014 | Moriguchi et al. |
| 2018/0338420 | A1 | 11/2018 | Manji et al. |
| 2020/0068801 | A1 | 3/2020 | Bengtzohn |
| 2021/0127568 | A1 * | 5/2021 | Wei ........................ G01B 11/26 |
| 2021/0219495 | A1 * | 7/2021 | Bengtzohn ............. A01D 34/64 |

FOREIGN PATENT DOCUMENTS

| | | | |
|---|---|---|---|
| EP | 3106014 | A1 | 12/2016 |
| EP | 3117695 | A1 | 1/2017 |
| EP | 3513645 | A1 | 7/2019 |
| JP | 2005295882 | A | 10/2005 |
| JP | 5722716 | B2 | 5/2015 |
| WO | WO-2016169380 | A1 * | 10/2016 ............. G01B 21/22 |
| WO | 2017/208049 | A1 | 12/2017 |
| WO | WO-2018161830 | A1 * | 9/2018 ........... A01D 34/006 |
| WO | 2020053670 | A1 | 3/2020 |
| WO | 2020171753 | A1 | 8/2020 |

OTHER PUBLICATIONS

Office Action and Search Report for Swedish Application No. 2051104-4 mailed on Apr. 12, 2020.

* cited by examiner

LOCKING DEVICE WITH FORCED UNPLUGGING OF CUTTING DECK

TECHNICAL FIELD

Example embodiments generally relate to yard maintenance vehicles and, more particularly, relate to a riding yard maintenance vehicle that employs a front mounted cutting deck that is electrically powered, and rotatable to a maintenance position from its normal in-use position.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors and articulated riders, can be much larger. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

As can be appreciated from the description above, riding yard maintenance vehicles may come in many different sizes and may have wide variances in their capabilities. However, beyond mere changes in size and function, riding yard maintenance vehicles can also be produced with a great deal of variation in relation to the configurations via which various ones of the functions they can perform are provided. For example, some riding yard maintenance vehicles may have attachments that are rear mounted, front mounted, or even mounted between the front and back wheels.

For riding yard maintenance vehicles having a front mounted cutting deck, a significant advantage is the ability to pivot or rotate the cutting deck from its normal in-use position (or cutting position) into a maintenance position. The maintenance position is typically achieved by pivoting the front end of the cutting deck upward, while the rear end of the cutting deck remains operably coupled to the riding yard maintenance vehicle. The cutting deck is therefore rotated about 90 degrees about a pivot point at the intersection between the cutting deck and the mounting portion of the riding yard maintenance vehicle to expose the blades and underside of the cutting deck for cleaning or other maintenance.

When the cutting deck is pivoted to the maintenance position, it is certainly desirable to ensure that the blades cannot be operated. For belt driven models, this may be relatively simple to accomplish. However, as more electrically driven components are added to riding yard maintenance vehicles (e.g., including electrically powered cutting decks) it may become less clear how to accomplish this goal.

Accordingly, it may be desirable to develop a way to ensure that even for an electrically driven cutting deck that can be pivoted to a maintenance position, the cutting deck cannot be in the maintenance position and still have power applied thereto.

BRIEF SUMMARY OF SOME EXAMPLES

In an example embodiment, a riding yard maintenance vehicle may be provided. The riding yard maintenance vehicle may include a frame to which front wheels and rear wheels of the riding yard maintenance vehicle are attachable, a steering assembly configured to receive steering inputs by an operator of the riding yard maintenance vehicle, and a mounting assembly disposed at a front end of the riding yard maintenance vehicle to which a working assembly is attachable. The working assembly may receive electrical power via a plug assembly and may be configured to transition between a working position and a maintenance position while operably coupled to the mounting assembly. The mounting assembly may include a locking assembly configured to prevent the transition from the working position to the maintenance position while the plug assembly provides power to the working assembly.

In another example embodiment, a mounting assembly for securing an electrically powered cutting deck to a riding yard maintenance vehicle may be provided. The mounting assembly may include an attachment frame including attachment rails disposed at a front of the riding yard maintenance vehicle, a coupling frame including coupling rails disposed at the cutting deck and configured to interface with the attachment frame, and a locking assembly configured to be operably coupled to at least a portion of both the attachment frame and the coupling frame. The cutting deck may be configured to transition between a working position and a maintenance position while operably coupled to the riding yard maintenance vehicle. The locking assembly may be configured to prevent the transition between the working position and the maintenance position while a plug assembly provides power to the cutting deck.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
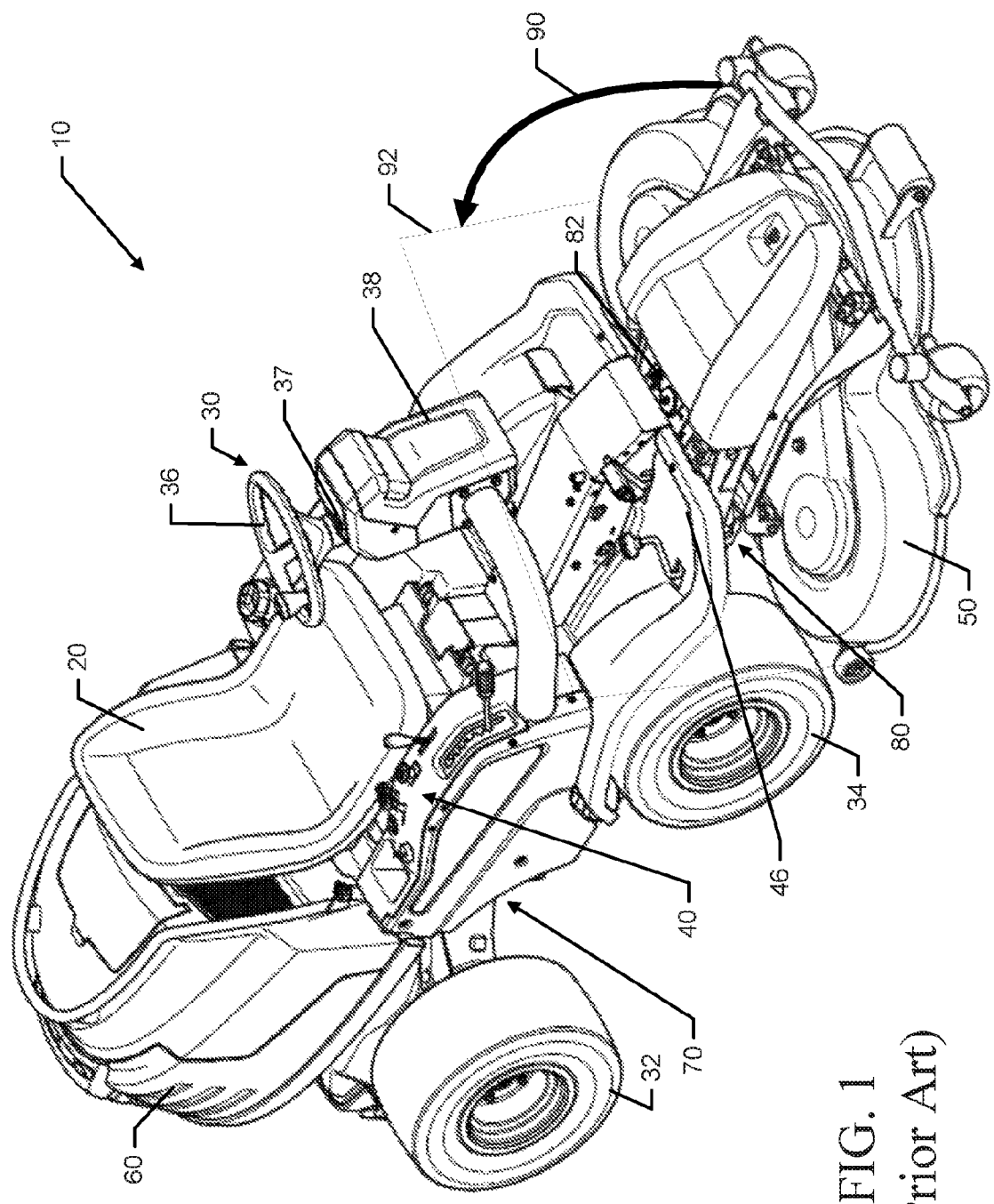
FIG. 1 illustrates a perspective view of a riding yard maintenance vehicle.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide an improved capability to render the cutting deck inoperable when shifted to the maintenance position. In this regard, example embodiments may be structured so that the cutting deck cannot be transitioned to the maintenance position without first removing power to the cutting deck.

FIG. 1 illustrates a riding yard maintenance vehicle 10 as one example of a conventional, belt driven model. The particular model shown, which includes front mounted equipment and is an articulated rider, but it should be understood that example embodiments are not limited to such models. As such, other models, including models without articulated steering, could also be operated with a mounting assembly as described herein.

In some embodiments, the riding yard maintenance vehicle 10 may include a seat 20 that may be disposed at a center, rear or front portion of the riding yard maintenance vehicle 10. The riding yard maintenance vehicle 10 may also include a steering assembly 30 (e.g., a steering wheel, handle bars, joystick(s) or the like) operably coupled to rear wheels 32 of the riding yard maintenance vehicle 10 to allow the operator to steer the riding yard maintenance vehicle 10 via steering inputs that are communicated to the rear wheels 32 (or front wheels 34). However, other steering arrangements are possible in other embodiments and the type of steering assembly 30 employed is not limiting to example embodiments.

The steering assembly 30 may include a steering wheel 36 and a steering column 37. The steering column 37 may operably connect to additional steering assembly components or, in other embodiments, to the front wheels 34. Moreover, the steering column 37 may extend into a steering console 38, which may provide a cover to improve the aesthetic appearance of the riding yard maintenance vehicle 10 by obscuring the view of various mechanical components associated with the steering assembly 30. In some cases, the steering assembly 30 may include other equipment (e.g., steering levers or handlebars) instead of the steering wheel 36.

The operator may sit on the seat 20, which may be disposed to the rear of the steering assembly 30 to provide input for steering of the riding yard maintenance vehicle 10 via the steering assembly 30. The riding yard maintenance vehicle 10 may also include additional control related components that may be disposed at a control panel 40, which may be positioned proximate to the seat 20 to enable an operator to easily access various control related components located at the control panel 40. The control related components may include levers, switches and/or the like configured to provide control over certain functions or components such as a blade speed adjuster, a choke control, a cutting height adjuster and/or a cutting unit lifting controller.

In some cases, one or more additional controllers, may be provided in the form of foot pedals that may sit proximate to a footrest 46 (which may include a portion on both sides of the riding yard maintenance vehicle 10 (e.g., on opposite sides of the steering console 38)) to enable the operator to rest his or her feet thereon while seated in the seat 20. These foot pedals may provide speed control for forward and/or backward operation, breaking, cutting deck lifting or other functions. Other levers, operators or components are possible in other examples as well.

The steering assembly 30 may be embodied as an assembly of metallic or other rigid components that may be welded, fitted, bolted or otherwise operably coupled to each other and coupled to the wheels (e.g., rear wheels 32 and/or front wheels 34) of the riding yard maintenance vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding yard maintenance vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blades when the cutting blades are rotated below the cutting deck 50 and the cutting deck 50 is in a cutting position (which is the position shown in FIG. 1). When operating to cut grass, grass clippings may be captured by a collection system, mulched, or expelled from the cutting deck 50 (e.g., via a discharge that may be directed to a side or rear of the cutting deck and/or riding yard maintenance vehicle 10). In some cases, the cutting deck 50 may be replaced by other working attachments to change the configuration of the riding yard maintenance vehicle 10 and correspondingly change the tasks that may be performed by the riding yard maintenance vehicle 10. Thus, for example, a plow blade or snow blower attachment may be provided to convert the riding yard maintenance vehicle 10 into a snow removal device. Alternatively, a tiller attachment may be provided to convert the riding yard maintenance vehicle 10 into a ride-on or remote control operable tiller. Other attachments and configurations are also possible such as a sweeper, brush cutter, or the like. In each case, the different type of attachment may be considered to be a respective different type of accessory that can be powered by the riding yard maintenance vehicle 10 (as one example host device).

In the pictured example of FIG. 1, an engine of the riding yard maintenance vehicle 10 is disposed in an engine compartment 60 that is behind a seated operator in a rear portion of the riding yard maintenance vehicle 10. However, in other example embodiments, the engine could be in different positions such as in front of or below the operator. In some embodiments, the engine may be operably coupled to one or more of the wheels of the riding yard maintenance vehicle 10 in order to provide drive power for the riding yard maintenance vehicle 10. In some embodiments, the engine may be capable of powering two wheels, while in others, the engine may power all four wheels of the riding yard maintenance vehicle 10. Moreover, in some cases, the engine may manually or automatically shift between powering either some wheels or all four wheels of the riding yard maintenance vehicle 10.

The engine, the steering assembly 30, the cutting deck 50, the seat 20 and other components of the riding yard maintenance vehicle 10 may be operably connected (directly or indirectly) to a frame of the riding yard maintenance vehicle 10. The frame may be a rigid structure configured to provide support, connectivity and interoperability functions for various ones of the components of the riding yard maintenance vehicle 10. In some embodiments, the frame may be split or articulated such that, for example, the front wheels 34 are disposed on an opposite portion of the frame than the portion of the frame on which the back wheels 32 are disposed with respect to an articulated joint 70 in the frame. However, as noted above, the articulated joint 70 shown here is merely an example and many models may not employ the articulated joint 70.

The cutting deck 50 may be attached to the frame of the riding yard maintenance vehicle 10 via a mounting assembly 80. A belt drive assembly 82 may also operably couple the engine of the riding yard maintenance vehicle 10 to the blades inside the cutting deck 50 to drive the blades for cutting while the cutting deck 50 is in the cutting position. Meanwhile, the cutting deck 50 may be rotated or pivoted in the direction shown by arrow 90 to the maintenance position 92 shown generally in dashed lines in FIG. 1.

For a device having the belt drive assembly 82 of FIG. 1, the v-belt that extends from the belt pulley situated on the machine prevents the cutting deck 50 from becoming fully separated from, or falling off, the machine. Meanwhile, the structures of such device can also ensure that there is no possibility to operate the belt when the cutting deck 50 is rotated to the maintenance position 92. However, if the blades inside the cutting deck 50 were instead powered by electricity instead of being belt driven, there would obviously be no such v-belt. In this regard, an electrically powered cutting deck would be expected to potentially have a plug that is removable (i.e., can be unplugged) to remove power to the cutting deck. Once removed, there would be no impediment to the cutting deck falling off or becoming fully separated from the machine. Moreover, there is also not necessarily any impediment to shifting the cutting deck to the maintenance position while remaining plugged in, and therefore potentially being powered in the maintenance position. Accordingly, example embodiments provide a structure for both holding the cutting deck in contact with the machine when transitioned to the maintenance position and that require disconnection of the power supply prior to transitioning to the maintenance position.

Figure 2:
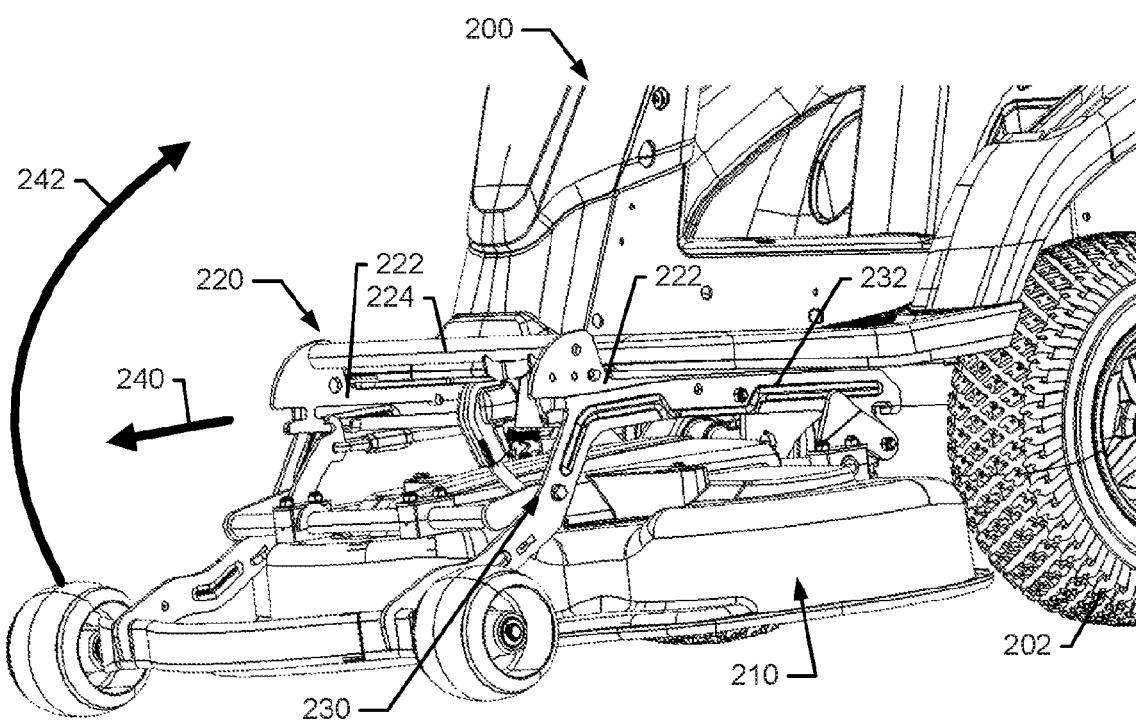
FIG. 2 illustrates a perspective view of a mounting assembly of a riding yard maintenance vehicle of an example embodiment.
Figure 3:
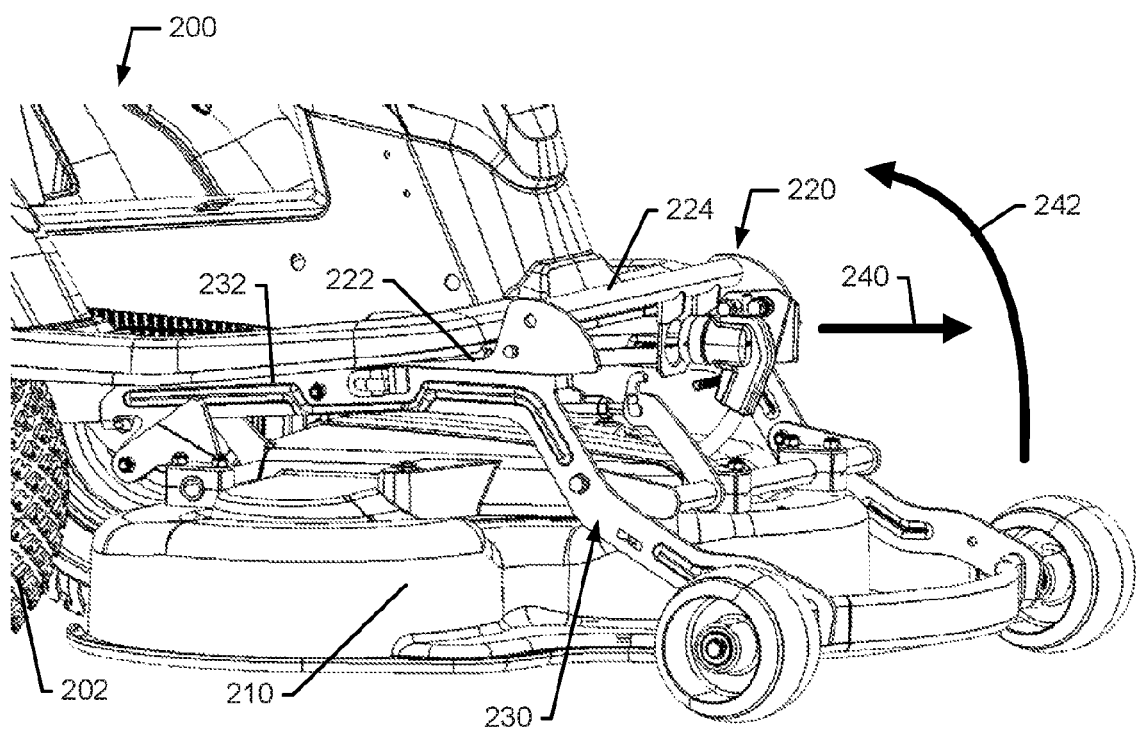
FIG. 3 illustrates another perspective view of the mounting assembly of the riding yard maintenance vehicle according to an example embodiment.

FIGS. 2-7 illustrate an example embodiment that provides a mounting assembly configured to ensure that power is removed from the cutting deck prior to shifting into a service or maintenance position. Referring now primarily to FIGS. 2 and 3, a riding lawn maintenance vehicle 200 is shown having a cutting deck 210 that is mounted forward of front wheels 202. The cutting deck 210 is mounted to the riding lawn maintenance vehicle 200 via an attachment frame 220 that is disposed forward of the front wheels 202. The attachment frame 220 may include two parallel attachment rails 222 that are spaced apart from each other to extend along opposing sides of the riding lawn maintenance vehicle 200. The attachment rails 222 may have a reinforcement bar 224 extending therebetween to provide strength thereto, and other components such as connection points, reinforcement members, and joints may also be defined between the attachment frame 220 and the frame or chassis of the riding yard maintenance vehicle 200, but such other components are outside the scope of this disclosure. However, it should be appreciated that all such components may be considered to be parts of a mounting assembly configured to operably couple the attachment frame 220 and the coupling frame 230. Thus, the mounting assembly includes the attachment frame 220 and the coupling frame 230 along with components thereof.

The attachment frame 220 of the riding yard maintenance vehicle 100 may be configured to interface with a coupling frame 230 of the cutting deck 210 to hold the cutting deck 210 in an operating or cutting position (which is the position shown in FIGS. 2 and 3). The coupling frame 230 may include coupling rails 232 that extend substantially parallel to each other and are spaced apart from each other such that the coupling rails 232 correspond to respective ones of the attachment rails 222 of the attachment frame 220 when the cutting deck 210 is operably coupled to the riding lawn maintenance vehicle 200.

One or more locking features may be included to retain the coupling frame 230 in contact with the attachment frame 220 while in the cutting position. Meanwhile, such locking features may be released to allow the cutting deck 210 to be slid forward (i.e., in the direction of arrow 240) relative to the riding yard maintenance vehicle 100 to enable pivoting of the cutting deck 210 in the direction of arrow 242 to the maintenance position.

Because the cutting deck 210 of this embodiment is electrically powered, a plug assembly 250 is provided to electrically connect the riding yard maintenance vehicle 200 to the cutting deck 210 to power the cutting deck 210 to turn blades therein. The plug assembly 250 may include a plug 252 and a receptacle 254. In this example, the plug 252 is a part of the cutting deck 210 and the receptacle 254 is a part of the riding yard maintenance vehicle 200. However, it may be possible to reverse that arrangement in some examples.

The plug 252 of this embodiment may be removed from the receptacle 254 by pulling the plug 252 in the direction of arrow 240. When the plug 252 is removed from the receptacle 254, no power is provided to the cutting deck 210 and maintenance on the cutting deck 210 may be accomplished with the assurance that now powered operation thereof is possible. It may be possible to provide interlocks, switches and/or the like to cut off power to the cutting deck 210 based on the various positions of components including, for example, based on sliding the cutting deck 210 forward in the direction of arrow 242 prior to pivoting thereof, or based on pivoting the cutting deck 210 in the direction of arrow 242. However, such interlocks or switches could potentially fail with age and/or damage due to various environmental conditions. Thus, physically removing the plug 252 from the receptacle 254 is the most reliable way to ensure power is removed at the cutting deck 210 prior to moving to the maintenance position.

Figure 4:
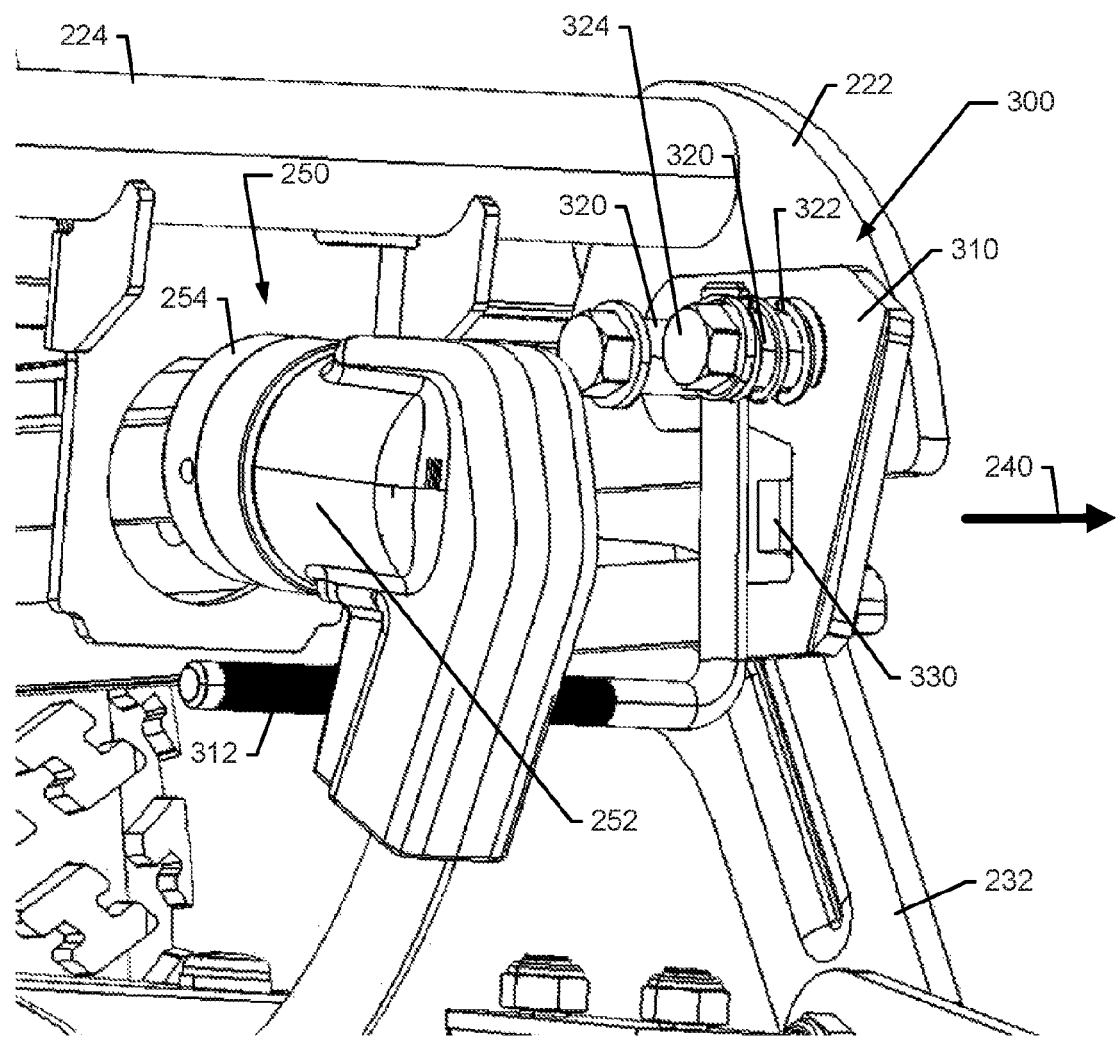
FIG. 4 illustrates a perspective view of a plug assembly and locking assembly according to an example embodiment.
Figure 5:
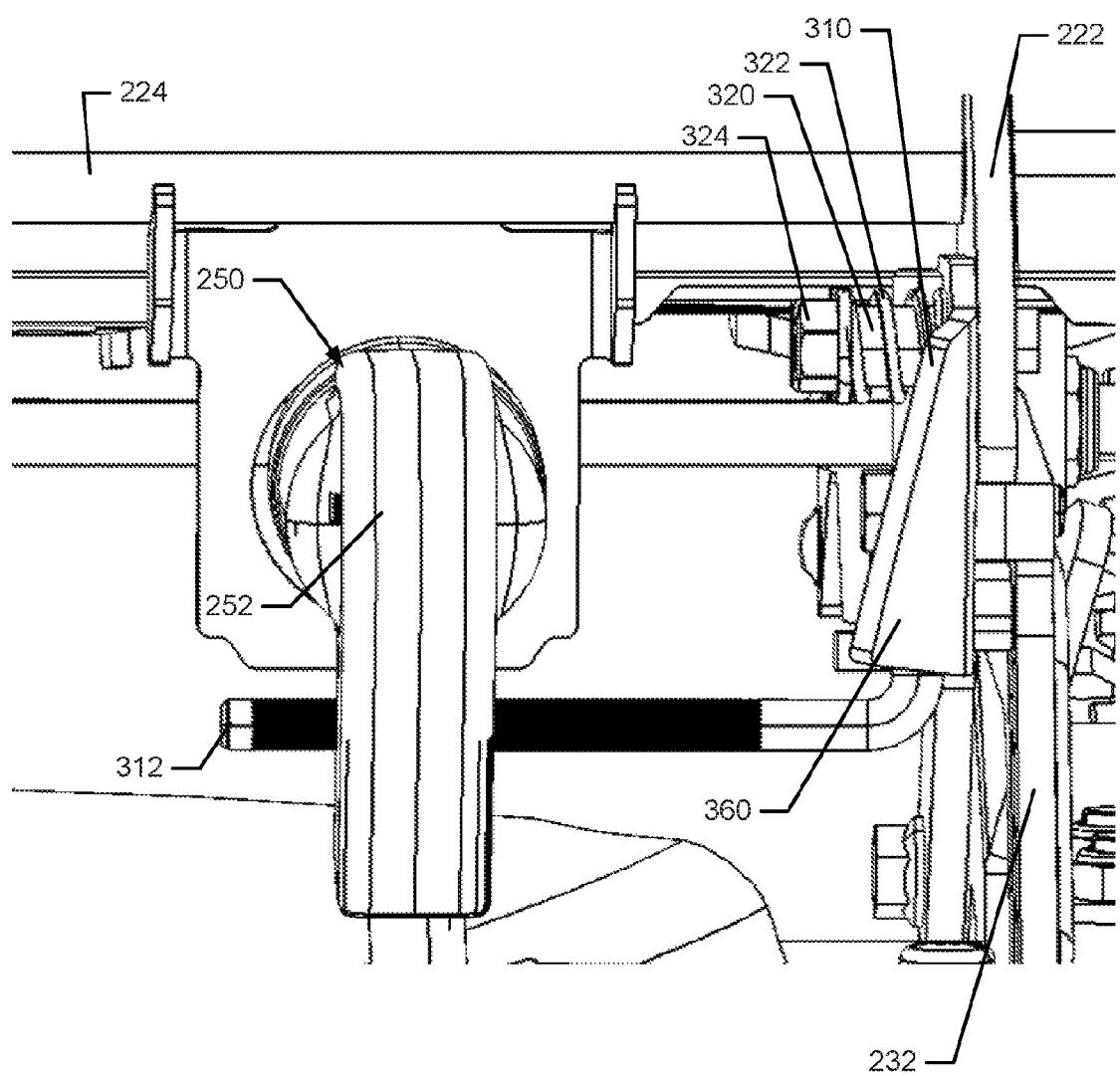
FIG. 5 illustrates a front view of the plug assembly and the locking assembly according to an example embodiment according to an example embodiment.
Figure 6:
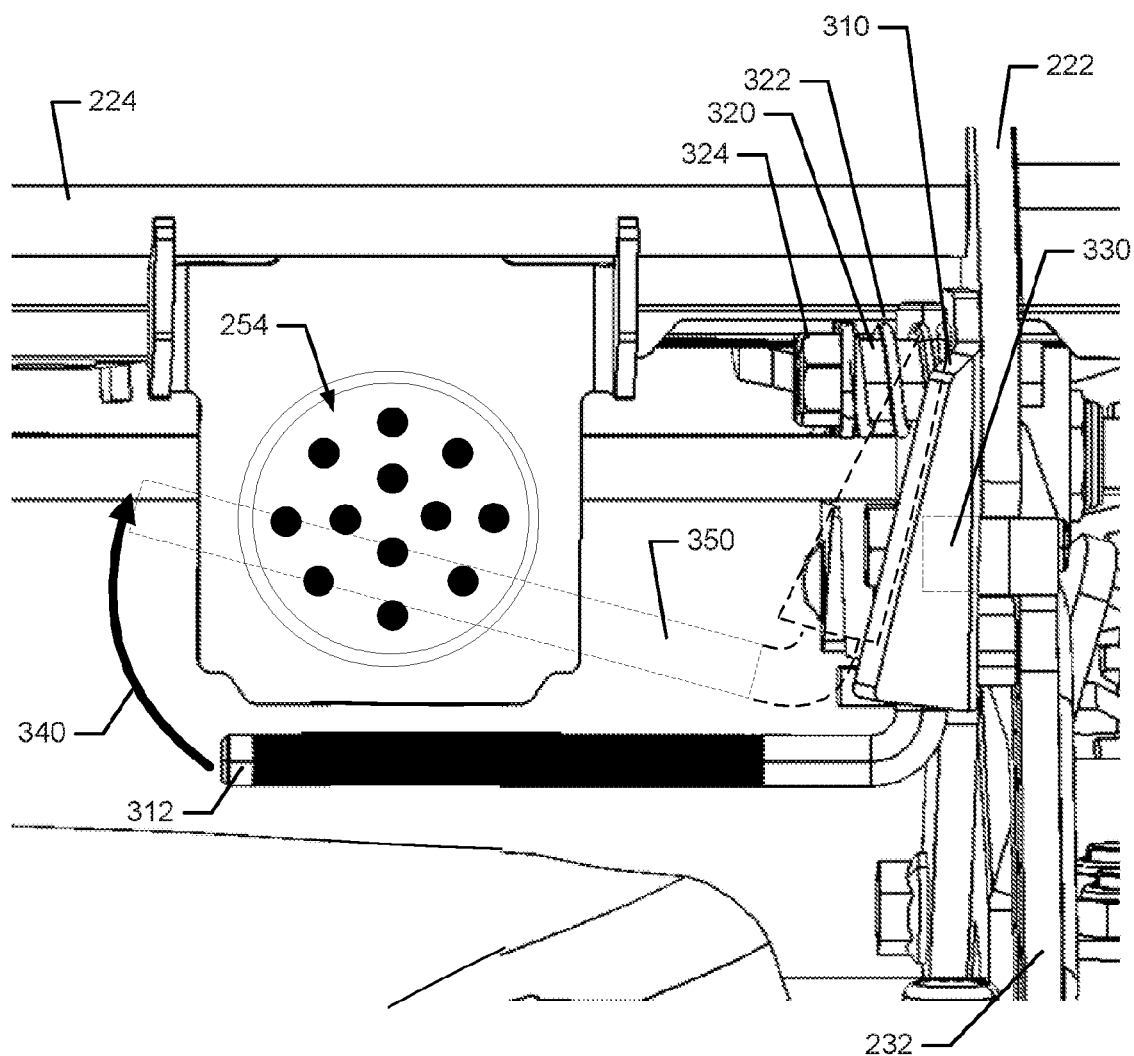
FIG. 6 illustrates the same view shown in FIG. 5 except that a plug of the plug assembly is removed to permit unlocking of the locking assembly in accordance with an example embodiment.

Accordingly, the mounting assembly of an example embodiment may include a locking assembly 300, which is visible in FIG. 3, but is shown in greater detail in FIGS. 4-6. The locking assembly 300 may be configured such that the cutting deck 210 cannot be transitioned to the maintenance position unless the locking assembly 300 has been unlocked. Moreover, the locking assembly 300 is further structured such that the locking assembly 300 cannot be unlocked until the plug 252 is removed from the receptacle 254. The locking assembly 300 therefore serves dual purposes of ensuring that the cutting deck 210 remains locked in connection with the riding yard maintenance vehicle 200 until unlocked, and preventing such unlocking until power is definitively removed from the cutting deck 210.

The locking assembly 300 may include a bracket 310 that is connected to a handle 312 and pivotally mounted to one of the attachment rails 222 of the attachment frame 220. In the depicted example, the locking assembly 300 is disposed on the attachment rail 222 on the left side of the riding yard maintenance vehicle 200, but the arrangement could easily be reversed so that the locking assembly 300 was instead provided on the right side of the riding yard maintenance vehicle 200. In this example, there are two mounting members 320 (e.g., mounting screws, posts, or the like) that are rigidly attached to the attachment rail 222. One of the mounting members 320 may merely be provided for alignment, and the other one of mounting members 320 may include a spring 322 that is disposed between a head 324 of the mounting member 320 and the bracket 310 proximate to a receiving hole formed at a top portion of the bracket 310. The spring 322 may exert a force on the top portion of the bracket 310 to retain the bracket 310 in a locked position (which is shown in FIGS. 4 and 5). In the locked position, a surface of the attachment rail 222 may abut and be substantially parallel to a contact surface of the bracket 310.

The coupling rail 232 corresponding to the attachment rail 222 may include a protrusion 330. The protrusion 330 may have a wider width than the coupling rail 232 or otherwise extend inwardly from the coupling rail 232 by a distance sufficient to engage the bracket 310 when the bracket 310 is in a resting or normal (locked) position. When the cutting deck 210 is in the cutting position, the coupling rail 232 and attachment rail 222 may be astride each other such that the protrusion 330 is retained by the bracket 310. In this regard, the bracket 310 may interfere with and may prevent withdrawal of the cutting deck 210 in the direction of arrow 240. Moreover, when the plug 252 is attached to the receptacle 254, the plug 252 further blocks any pivoting or movement of the handle 312 that would be sufficient to enable the protrusion 330 to be released from contact with the bracket 310. Thus, for as long as the plug 252 is in the receptacle 254, it is not possible to move the bracket 310 out of a blocking or interfering position relative to the protrusion 330. The protrusion 330 will therefore be retained by the bracket 310 for as long as the plug 252 is in the receptacle 254 and until the bracket 310 can be pivoted out of the way of the protrusion 330.

FIG. 6 illustrates a condition in which the plug 252 has been removed from the receptacle 254. As can be seen from this condition, the handle 312 is clear (due to the absence of the plug 252) to be lifted upward as shown by arrow 340. Lifting the handle 312 causes the handle 312 to move an unlock position 350 shown in dashed lines in FIG. 6. In the unlock position 350, the bracket 310 no longer blocks and retains the protrusion 330. Thus, the protrusion 330 is free to move past the bracket 310 and the cutting deck 210 can be slid forward in the direction of arrow 240 to permit rotation of the cutting deck 210 to the maintenance position. While the handle 312 is lifted, the spring 322 is compressed between the bracket 310 and the head 324 of the mounting member 320 to which the spring 322 is attached. When the handle 312 is released, the spring 322 decompresses to cause the bracket 310 to move back into contact with the surface of the attachment rail 222.

Although each of the mounting members 320 could have a corresponding instance of the spring 322, duplication of the spring 322 (or any other biasing member) is not necessary. Instead, the second mounting member 320 provides guidance and retention to limit the possible directions of movement of the bracket 310 when the handle 312 is lifted. In this regard, the existence of two mounting members 320 ensures that the bracket 310 does not pivot about the axis of the mounting members 320. Instead, the bracket 310 pivots toward the axis of the mounting members 320 (e.g., pivoting about an upper edge of the bracket 310, or the edge closest to which the mounting members 320 pass through the bracket 310). The second mounting member 320 also provides pivoting of the bracket 310 when the protrusion 330 is pushing against the second mounting member 320 (e.g., if the cutting deck 210 is forced toward the working position in a return from the maintenance position or for installation).

Figure 7:
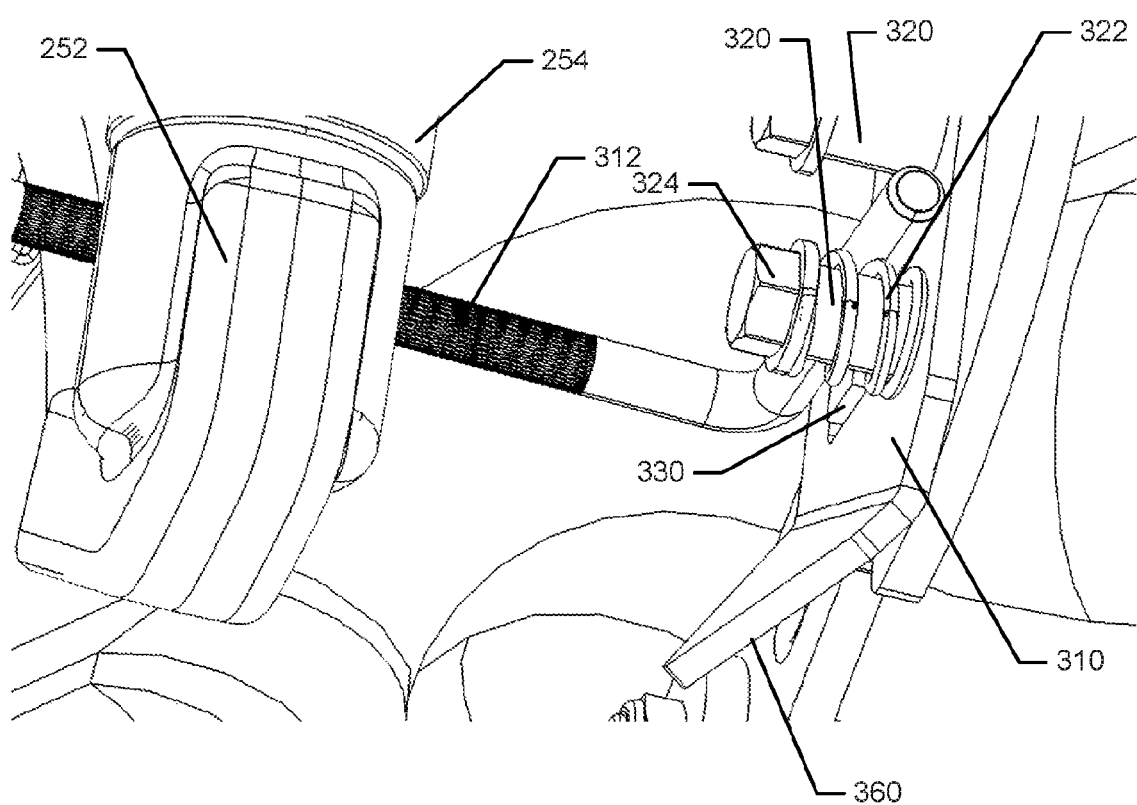
FIG. 7 illustrates a perspective view of the locking assembly in accordance with an example embodiment.

In some cases, the bracket 310 may include a ramp portion 360. The ramp portion 360 may allow return of the protrusion 330 to the locked position without requiring the operator to use the handle 312. In this regard, for example, when it is desired to move the cutting deck 210 back to the cutting position, the bracket 310 may need to move to allow the protrusion 330 to pass the bracket 310 to reach the cutting position and be retained by the bracket as shown in FIG. 7. To facilitate this the protrusion 330 may, when moving in a direction opposite that shown by arrow 240, engage the ramp portion 360 and push the bracket 310 to compress the spring 322 thereby lifting the handle 312 as shown by arrow 340. When the protrusion 330 has passed the ramp portion 360 and the bracket 310, the bracket 310 may move back into contact with the attachment rail 222 and retain the protrusion in the position shown in FIG. 7.

Some embodiments of the invention provide a riding yard maintenance vehicle. The riding yard maintenance vehicle may include a frame to which front wheels and rear wheels of the riding yard maintenance vehicle are attachable, a steering assembly configured to receive steering inputs by an operator of the riding yard maintenance vehicle, and a mounting assembly disposed at a front end of the riding yard maintenance vehicle to which a working assembly is attachable. The working assembly may receive electrical power via a plug assembly and may be configured to transition between a working position and a maintenance position while operably coupled to the mounting assembly. The mounting assembly may include a locking assembly configured to prevent the transition from the working position to the maintenance position while the plug assembly provides power to the working assembly.

In some embodiments, the riding yard maintenance vehicle (and/or the mounting assembly thereof) may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the working assembly may include a cutting deck, and the working position may be a cutting position. The maintenance position may be achieved by sliding the cutting deck forward prior to pivoting the cutting deck about a rear portion of the cutting deck. In an example embodiment, the mounting assembly may include a coupling frame including coupling rails disposed at the cutting deck, and an attachment frame including attachment rails disposed at the front end of the riding yard maintenance vehicle. The coupling rails may interface with the attachment rails, and the locking assembly may include a bracket having a locked position and an unlocked position. The bracket may be disposed to contact a portion of one of the attachment rails and prevent forward movement of a corresponding one of the coupling rails in the locked position, and to enable forward movement of the corresponding one of the coupling rails in the unlocked position. In some cases, the corresponding one of the coupling rails may include a protrusion configured to interface with the bracket in the locked position and avoid contact with the bracket in the unlocked position. In an example embodiment, the bracket may be operably coupled to a handle that is movable to cause the bracket to transition between the locked position and the unlocked position. The plug assembly may be configured to prevent movement of the handle when a plug of the plug assembly is operably coupled to a receptacle of the plug assembly. For example, the plug may block movement of the handle when installed in the receptacle. In some cases, the bracket may be operably coupled to the one of the attachment rails via a mounting member, and a biasing member may be operably coupled to the bracket to bias the bracket to the locked position. In an example embodiment, the biasing member may include a spring operably coupled to the mounting member to urge the bracket toward the one of the attachment rails. In some cases, the bracket pivots relative to the mounting member away from the protrusion responsive to lifting the handle when the plug is disconnected from the receptacle. In an example embodiment, the bracket pivots toward an axis of the mounting member responsive to lifting the handle. In some cases, the bracket may include a ramped portion configured to interface with the protrusion to move the bracket toward the unlocked position responsive to rearward motion of the cutting deck causing the protrusion to contact the bracket.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A mounting assembly for securing an electrically powered cutting deck to a riding yard maintenance vehicle, the mounting assembly comprising:
   an attachment frame comprising attachment rails disposed at a front of the riding yard maintenance vehicle;
   a coupling frame comprising coupling rails disposed at the cutting deck and configured to interface with the attachment frame; and
   a locking assembly configured to be operably coupled to at least a portion of both the attachment frame and the coupling frame,
   wherein the cutting deck is configured to transition between a working position and a maintenance position while operably coupled to the riding yard maintenance vehicle,
   wherein the locking assembly is configured to prevent the transition between the working position and the maintenance position while a plug assembly provides power to the cutting deck.

2. The mounting assembly of claim 1, wherein the working position is a cutting position, and the maintenance position is achieved by sliding the cutting deck forward prior to pivoting the cutting deck about a rear portion of the cutting deck.

3. The mounting assembly of claim 1, wherein the locking assembly comprises a bracket having a locked position and an unlocked position, the bracket being disposed to contact a portion of one of the attachment rails and prevent forward movement of a corresponding one of the coupling rails in the locked position, and to enable forward movement of the corresponding one of the coupling rails in the unlocked position.

4. The mounting assembly of claim 3, wherein the corresponding one of the coupling rails includes a protrusion configured to interface with the bracket in the locked position and avoid contact with the bracket in the unlocked position.

5. The mounting assembly of claim 4, wherein the bracket is operably coupled to a handle,
   wherein the handle is movable to cause the bracket to transition between the locked position and the unlocked position, and
   wherein the plug assembly is configured to prevent movement of the handle when a plug of the plug assembly is operably coupled to a receptacle of the plug assembly.

6. The mounting assembly of claim 5, wherein the bracket is operably coupled to the one of the attachment rails via a mounting member, and
   wherein a biasing member is operably coupled to the bracket to bias the bracket to the locked position.

7. The mounting assembly of claim 6, wherein the biasing member comprises a spring operably coupled to the mounting member to urge the bracket toward the one of the attachment rails.

8. The mounting assembly of claim 7, wherein the bracket pivots relative to the mounting member away from the protrusion responsive to lifting the handle when the plug is disconnected from the receptacle.

9. The mounting assembly of claim 8, wherein the bracket pivots about an edge of the bracket that is closest to an axis of the mounting member responsive to lifting the handle.

10. The mounting assembly of claim 4, wherein the bracket comprises a ramped portion configured to interface with the protrusion to move the bracket toward the unlocked position responsive to rearward motion of the cutting deck causing the protrusion to contact the bracket.

11. A riding yard maintenance vehicle comprising:
    a frame to which front wheels and rear wheels of the riding yard maintenance vehicle are attachable;
    a steering assembly configured to receive steering inputs by an operator of the riding yard maintenance vehicle; and
    a mounting assembly disposed at a front end of the riding yard maintenance vehicle to which a working assembly is attachable, the working assembly receiving electrical power via a plug assembly and being configured to transition between a working position and a maintenance position while operably coupled to the mounting assembly,
    wherein the mounting assembly further comprises a locking assembly configured to prevent the transition from the working position to the maintenance position while the plug assembly provides power to the working assembly.

12. The riding yard maintenance vehicle of claim 11, wherein the working assembly comprises a cutting deck, and
wherein the working position is a cutting position, and the maintenance position is achieved by sliding the cutting deck forward prior to pivoting the cutting deck about a rear portion of the cutting deck.

13. The riding yard maintenance vehicle of claim 12, wherein the mounting assembly comprises:
a coupling frame comprising coupling rails disposed at the cutting deck; and
an attachment frame comprising attachment rails disposed at the front end of the riding yard maintenance vehicle,
wherein the coupling rails interface with the attachment rails, and
wherein the locking assembly comprises a bracket having a locked position and an unlocked position, the bracket being disposed to contact a portion of one of the attachment rails and prevent forward movement of a corresponding one of the coupling rails in the locked position, and to enable forward movement of the corresponding one of the coupling rails in the unlocked position.

14. The riding yard maintenance vehicle of claim 13, wherein the corresponding one of the coupling rails includes a protrusion configured to interface with the bracket in the locked position and avoid contact with the bracket in the unlocked position.

15. The riding yard maintenance vehicle of claim 14, wherein the bracket is operably coupled to a handle,
wherein the handle is movable to cause the bracket to transition between the locked position and the unlocked position, and
wherein the plug assembly is configured to prevent movement of the handle when a plug of the plug assembly is operably coupled to a receptacle of the plug assembly.

16. The riding yard maintenance vehicle of claim 15, wherein the bracket is operably coupled to the one of the attachment rails via a mounting member, and
wherein a biasing member is operably coupled to the bracket to bias the bracket to the locked position.

17. The riding yard maintenance vehicle of claim 16, wherein the biasing member comprises a spring operably coupled to the mounting member to urge the bracket toward the one of the attachment rails.

18. The riding yard maintenance vehicle of claim 17, wherein the bracket pivots relative to the mounting member away from the protrusion responsive to lifting the handle when the plug is disconnected from the receptacle.

19. The riding yard maintenance vehicle of claim 18, wherein the bracket pivots about an edge of the bracket that is closest to an axis of the mounting member responsive to lifting the handle.

20. The riding yard maintenance vehicle of claim 14, wherein the bracket comprises a ramped portion configured to interface with the protrusion to move the bracket toward the unlocked position responsive to rearward motion of the cutting deck causing the protrusion to contact the bracket.

* * * * *